United States Patent [19]

Hogge, Jr.

[11] Patent Number: 4,520,489

[45] Date of Patent: May 28, 1985

[54] DECISION FEEDBACK EQUALIZING APPARATUS

[75] Inventor: Charles R. Hogge, Jr., Richardson, Tex.

[73] Assignee: Rockwell International Corporation, El Segundo, Calif.

[21] Appl. No.: 523,203

[22] Filed: Aug. 15, 1983

[51] Int. Cl.³ .............................................. H04B 3/08
[52] U.S. Cl. .................................... 375/14; 333/28 R
[58] Field of Search ............... 375/11, 12, 14; 333/18, 333/28 R; 307/350, 354, 356, 359; 328/150, 164; 178/69 R, 69 M

[56] References Cited

U.S. PATENT DOCUMENTS

| 4,170,758 | 10/1979 | Tamburelli | 375/12 |
| 4,243,956 | 1/1981 | Lemoussu et al. | 333/18 |
| 4,273,963 | 6/1981 | Seidel | 333/28 R |
| 4,367,555 | 1/1983 | Namiki et al. | 333/18 |

Primary Examiner—Benedict V. Safourek
Attorney, Agent, or Firm—Bruce C. Lutz; V. Lawrence Sewell; H. Fredrick Hamann

[57] ABSTRACT

A circuit for providing decision feedback equalization uses a variable gain differential amplifier as a level detector and variable gain adjustment to provide nondelayed positive feedback and bit time delayed intersymbol interference compensating feedback to both enhance the amplitude of the present bit and reduce the intersymbol interference of one or more prior bits in a pulse bit stream.

7 Claims, 3 Drawing Figures

DECISION FEEDBACK EQUALIZING APPARATUS

THE INVENTION

The present invention is generally related to electronics and more specifically to compensation for intersymbol interference between adjacent pulses in a digital bit stream. Even more specifically, the present invention is related to equalization techniques utilized in reducing the intersymbol interference, and to enhancing the squareness and the amplitude of the present bit pulse during the equalization process.

In the prior art, when transmitting of digital data at relatively high rates over a linear channel that introduces significant intersymbol interference into its output signal, it is common practice to remove this interference by means of either a linear feedforward or a nonlinear (decision feedback) equalizer in the receiver. The nonlinear equalizer often achieves an advantage in tolerance to additive noise over the corresponding linear equalizer. The conventional linear equalizer consists basically of a transversal filter which is conceptually a delay line tapped at T-Sec. intervals. Each tap is connected through a variable gain (which can be negative) to a summing bus. This scheme requires several taps to be effective in removing intersymbol interference. Moreover, a partial response signal resulting from bandwidth restriction will not become a full response signal using this type of equalizer. Thus, only the intersymbol interference will be removed.

The conventional nonlinear or decision feedback technique is similar to the above except that the transversal filter is used after a decision is made. In this approach, it may be assumed that at a sampling moment T, a decision is taken about the pulse polarity as represented by H(T). The interference which might be caused by the pulse in succeeding pulses can be eliminated by subtracting a compensation pulse represented by G(T) from H(T) after the decisions. Thus, pulse G(T) compensates H(T) at all successive decision moments. The signal loss due to bandwidth restriction will not be recovered in this case either.

The present invention is an implementation of a concept recognized in a copending application No. 523,205, filed on the same date as the present application. It is recognized in the referenced invention that by using positive nonlinear or decision feedback with no delay in combination with nonlinear or decision feedback, not only can the intersymbol interference resulting from pulse spreading to adjacent bits be removed, but in addition, the peak of the present pulse may be enhanced to obtain a full response signal and thereby produce maximum "eye" opening in the resulting equalized and compensated signal. Thus, the present invention is a specific implementation for processing the digital pulse stream, and adding a prescribed magnitude of the present bit and subtracting prescribed magnitudes of delayed bits to and from the present pulse appearing at the detector input.

The above referenced implementation is accomplished, in one embodiment of the present invention, through the use of a differential amplifier used as a level detector and providing opposite phase output signals based on the level detection with respect to a reference voltage level. The inphase signal is fed back immediately with no delay to the input of the detector, while the out-of-phase signal is delayed by a time equivalent to one or more bits, and fed back along with the positive feedback signal to the input of the detector to provide the total equalization and compensation.

It is, therefore, an object of the present invention to provide an improved decision feedback equalization approach to reducing intersymbol interference in a pulse bit stream, while simultaneously enhancing the amplitude of the pulses in the bit stream.

Other objects and advantages of the present invention may be ascertained from a reading of the specification and appended claims in conjunction with the drawings wherein:

DETAILED DESCRIPTION

Figure 1:
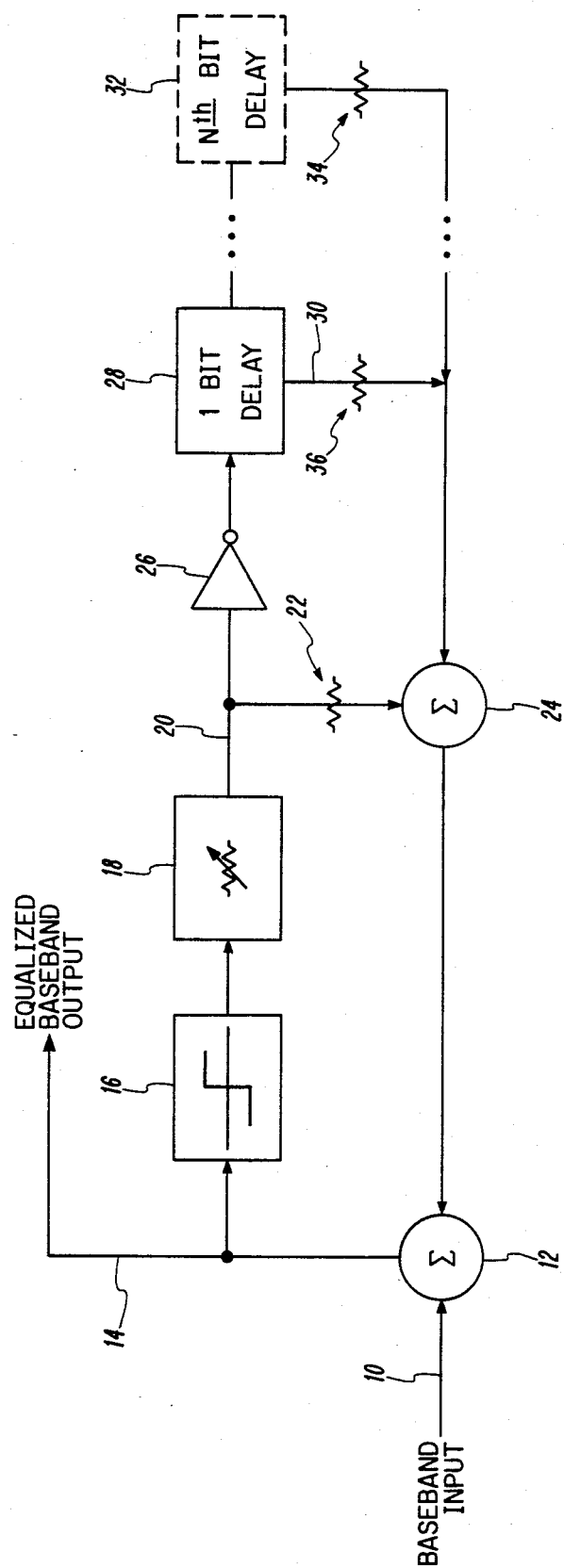
FIG. 1 is a block diagram of the present inventive concept.

In FIG. 1, a baseband input signal is provided on lead 10 to a summing means 12, and an output signal is provided from 12 on a lead 14 which not only is supplied to a level detector block 16, but also as an equalized baseband output signal. Level detector 16 provides the signal through a level adjusting block 18 to an output lead 20, which supplies signals through a further gain adjustment mechanism, generally designated as 22, to a summing means 24 and to the input of an inverter 26. The output of inverter 26 is supplied through a one bit delay block 28 and output on a lead 30. The three dots at the right hand side of FIG. 1 indicate that more delays may optionally be added, and a dash line block 32 represents the nth bit of delay. Each of the delays would have their own signal level weighting circuit element as part of the output and as represented by 34. The signal level weighting shown as 36 is the circuit element of primary concern to the one bit delay of block 28, and the signal on lead 30 after being level weighted by circuit element 36 is supplied as a second input to summing means 24. An output of summing means 24 provides a second input to summing means 12.

Figure 2:
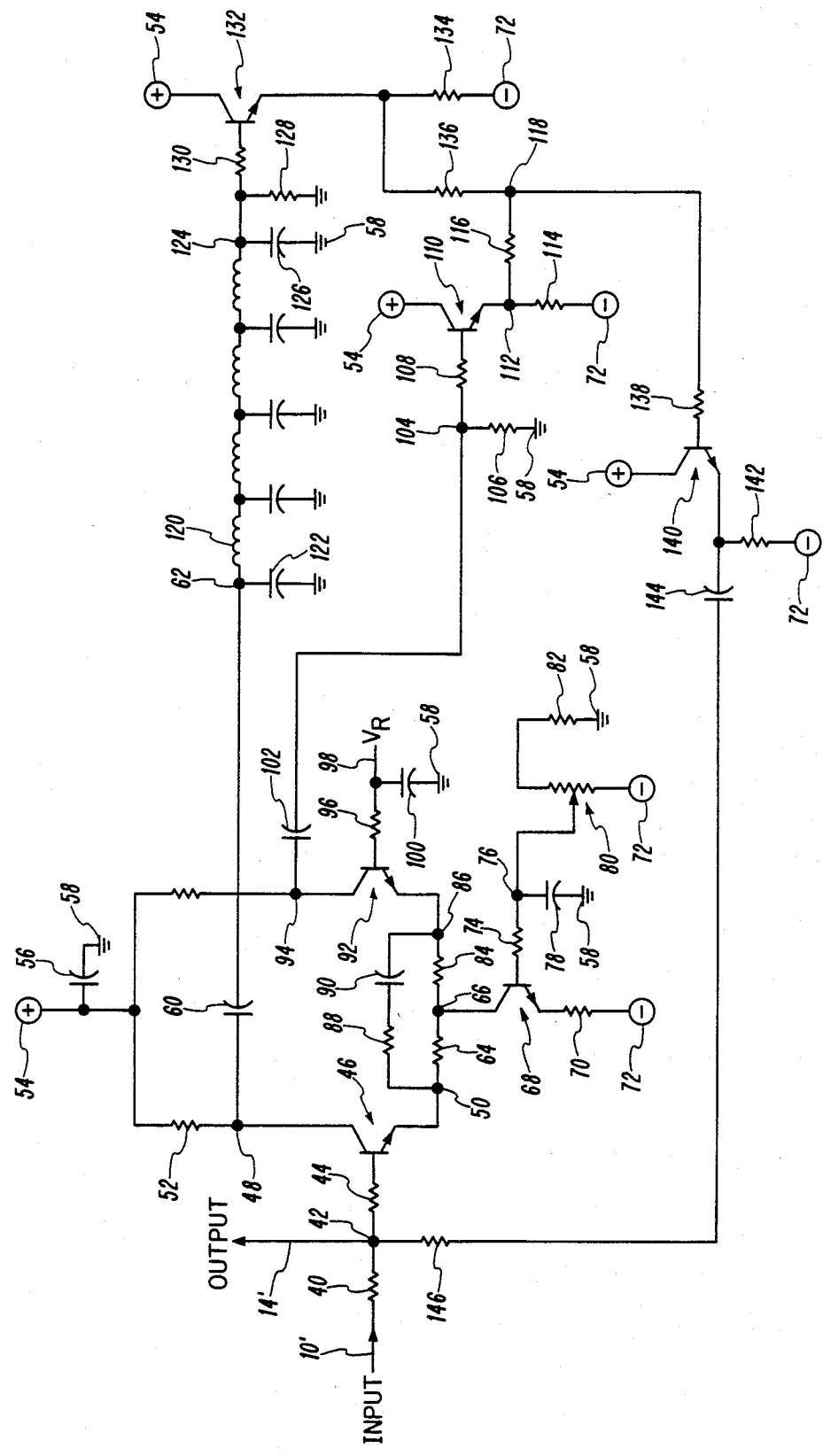
FIG. 2 is a first circuit diagram embodiment of the block diagram of FIG. 1.

In FIG. 2, an input 10' corresponding to 10 in FIG. 1 is a lead supplying input signals to the detector circuitry of FIG. 2. A resistor 40 is connected between input 10' and a junction point 42. An output lead 14' corresponding to the same lead in FIG. 1 is directly connected to junction point 42. A further resistor 44 is connected between junction point 42 and a base of a NPN transistor, generally designated as 46, having a collector connected to a junction point 48 and an emitter connected to a junction point 50. A resistor 52 is connected between junction point 48 and a positive power terminal 54. A filtering capacitor 56 is connected between power supply 54 and ground 58. A coupling capacitor 60 is connected between junction point 48 and a junction point 62. A resistor 64 is connected between junction point 50 and a junction point 66. An NPN transistor 68 has its collector connected to junction point 66 while its emitter is connected through a resistor 70 to a negative power supply terminal 72. A base of transistor 68 is connected through a resistor 74 to a junction point 76. A capacitor 78 is connected between junction point 76 and ground 58. Junction point 76 is connected to the wiper of a potentiometer, generally designated as 80, having one end of its resistance element connected to negative power supply 72 and the other end connected through a resistor 82 to ground 58. A resistor 84 is connected between junction point 66 and a junction point 86. A resistor 88 is connected in series with a capacitor 90 between junction point 50 and junction point 86. An NPN transistor, generally designated as 92, has its emitter connected to junction point 86, while its collector is connected to a junction point 94. A base of transistor 92 is connected through a resistor 96 to a reference voltage designated as 98. A capacitor 100 is connected between reference voltage 98 and ground 58. A capacitor 102 is connected between junction point 94 and a junction point 104. A resistor 106 is connected between junction point 104 and ground 58. A resistor 108 is connected between junction point 104 and a base of an NPN transistor, generally designated as 110, having its collector connected to positive potential 54 and its emitter connected to a junction point 112. A resistor 114 is connected between junction point 112 and negative potential 72. A further resistor 116 is connected between junction point 112 and a junction point 118. A plurality of inductive capacitive combinations such as 120 and 122 are connected between junction point 62 and a junction point 124. Each of these inductor capacitor combinations provides an L-filter for accomplishing time delay of a signal. A parallel resistor capacitor combination, designated as 126 and 128, is connected between junction point 124 and ground 58. A resistor 130 is connected between junction point 124 and the base of an NPN transistor, generally designated as 132, having its collector connected to positive potential 54. An emitter of transistor 132 is connected through a resistor 134 to negative potential 72. The emitter of transistor 132 is also connected through a resistor 136 to junction point 118. A resistor 138 is connected between junction point 118 and a base of an NPN transistor, generally designated as 140, having its collector connected to positive potential 54 and its emitter connected through a resistor 142 to negative potential 72. The emitter of transistor 140 is also connected through a coupling capacitor 144 and a summing resistor 146 to feed signals back to junction point 42.

Figure 3:
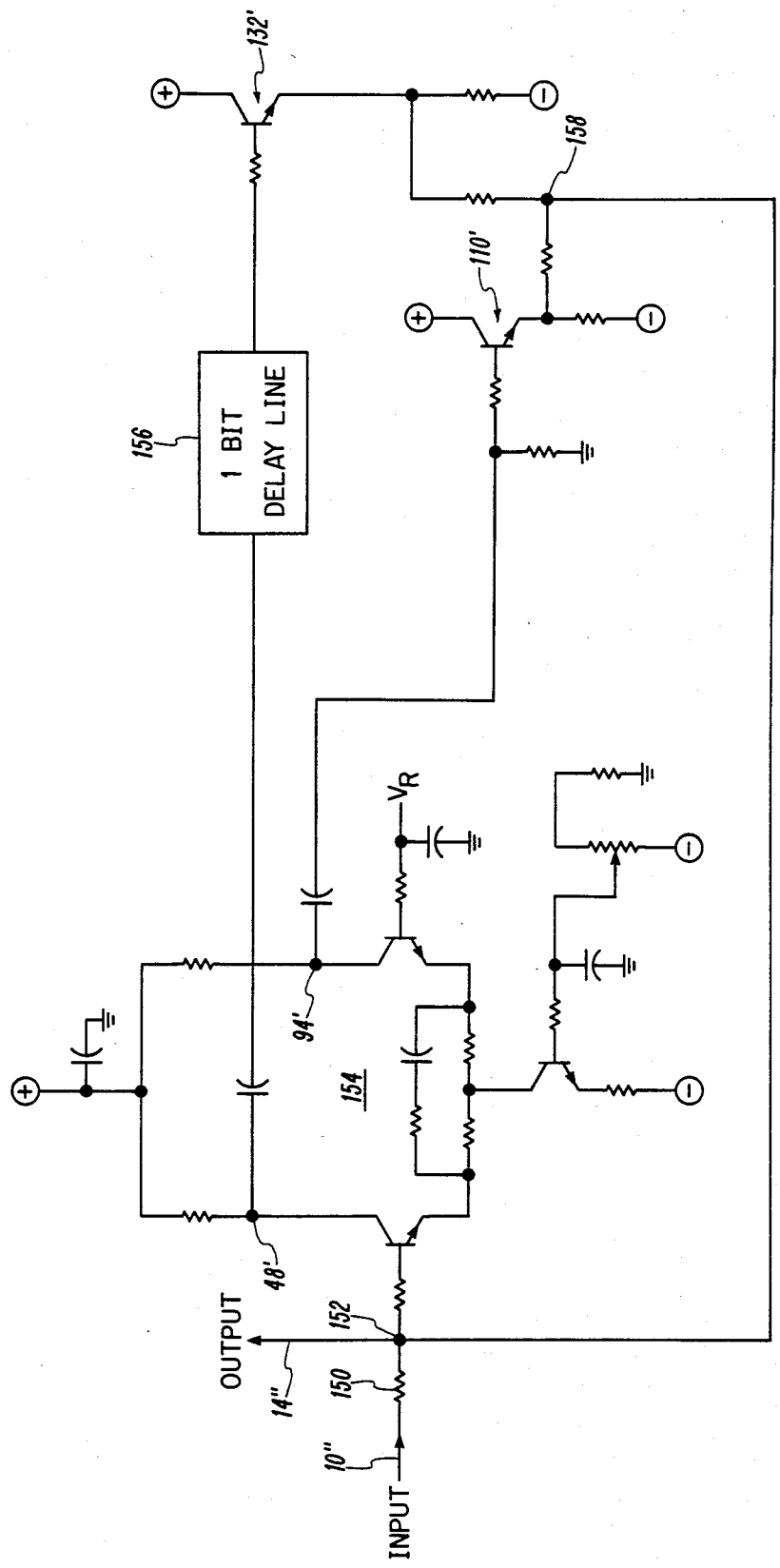
FIG. 3 is a further circuit diagram embodiment of the inventive concept of FIG. 1.

In FIG. 3, an input 10" supplies signals through a summing resistor 150 to a junction point 152 providing output signals on a lead 14". The signals on lead 152 are supplied to a decision logic circuit generally designated as 154 and having identical circuitry with that shown in FIG. 2. A first output 48' corresponding to that in FIG. 2 supplies signals through a coupling capacitor to a one bit delay line 156 and from there through a transistor 132' to a junction point 158. The delay of block 156 can be accomplished with a transmission line having no significant filtering effects. Signals are also output from decision processing circuit 154 via a junction point 94' and a transistor 110' to the junction point 158. Junction point 158 is directly connected to junction point 152. This direct connection reduces the small amount of delay introduced by transistor 140 of FIG. 2, and further increases the usability of the circuit as compared to the implementation of decision feedback as illustrated in FIG. 2.

OPERATION

Referring first to FIG. 1, it will be noted that the circuit accomplishes the feedback summing in summing means 12 before the signal is applied to level detector 16, and that this signal supplied to the level detector 16 is the equalized signal. The block 16 represents a level detector and provides a step change in the output when that level of input signal amplitude is passed. In other words, the output of block 16 is basically a square pulse of either polarity and maximum amplitude at either of the polarities. The block 18 is an impedance device which adjusts the gain of this maximum amplitude signal before it reaches lead 20. The signal is fed back in a positive feedback manner through the signal level weighting means 22 and summing means 24. This feedback signal enhances the present bit signal, since it adds to or reinforces the present bit information. As indicated above, the prior art decision feedback technique is to subtract from the present bit any intersymbol interference present from the previous bit due to pulse widening as a result of bandwidth restrictions, etc. By delaying the signal in delay block 28, the previous bit information is obtained. By inverting the signal in inverter 26, the previous bit signal at the output of delay 28 has the correct polarity such that subtraction occurs when it is applied to summing means 24. The amount of signal to be subtracted is determined by signal weighting means 36. The dash line block 32 indicates that further delays of other bit time increments may also be used if such additional equalization or intersymbol interference compensation is required.

Turning now to FIG. 2, it will be apparent that the differential amplifier utilizing transistors 46 and 92, in combination with a reference potential supplied at lead 98, provides the decision logic function of block 16. The resistances in the collector and emitter of these transistors provide the impedance matching, and the transistor 68 in conjunction with potentiometer 80 provides the gain adjust feature of block 18 of FIG. 1. The signal supplied at junction point 94 is a positive feedback or noninverted signal as shown on lead 20 of FIG. 1, while the signal obtained at junction point 48 is inverted as would appear at the output of inverter 26 of FIG. 1. The cascaded L-section filters, represented between junction point 62 and 124 in FIG. 2, provide a one bit time delay illustrated by block 28 in FIG. 1, and the resistors 116 and 136, connected to the emitters of transistors 110 and 132 provide the summing function of summing means 24 in FIG. 1.

FIG. 2 represents an initial embodiment of the inventive concept as illustrated and claimed in the previously referenced copending application. I ascertained, however, that the mathematically ideal shaping of the intersymbol interference feedback could be eliminated with no appreciable degradation in output signal on lead 14. Thus, the filtering of FIG. 2 was eliminated in the one bit delay line of FIG. 3, where the delay can be accomplished with a transmission line such as a microstrip meander delay line consisting of a conductor deposited on a ceramic substrate with ground plane on the opposite side. Further, the isolating effect of the transistor 140 and the coupling capacitor 144 can be eliminated to even further minimize any delay in the positive feedback signal as obtained from output 94' of the differential amplifier 154. The elimination of this delay increased the speed of the positive feedback. Thus, FIG. 3 is an improvement in speed of operation, a large reduction in parts and increased reliability. The gain adjust as provided by transistor 68 allows a field adjust to optimize intersymbol interference compensation in accordance with the particular bandwidth restrictions occurring to cause the intersymbol interference.

I also found as a part of the optimization of the circuit of FIG. 2, that if the resistors 116 and 136 are equal in value, the best compensation was obtained for one embodiment of the inventive concept.

It should be realized that the one bit delay 156 is not truly exactly a time delay equivalent to one bit, since there are small delays due to the finite propagation time through the active circuit and due to parasitic strap parallel capacitance and series inductance of the circuit elements and circuit runs. However, for all practical purposes the time delay in block 156 is equivalent to the period of one bit and the total time delay of delay line 156 in combination with other associated delays in the circuitry provide a delay substantially exactly equal to the period of one bit.

Since it is one of the bases upon which the present inventive concept is founded, it should be emphasized that the circuit as described herein is able to provide adequate equalization in many embodiments without any filters. While the delay 28 may be implemented as a broadband transmission line, this delay could also be implemented using other types of delays such as linear amplifier or under some circumstances possibly could be implemented using techniques such as flip-flops. If a flip-flop were to be used, the gain adjust 18 would have to be placed between summing means 24 and 12. This readjustment would be required so as to adjust not only the relative amounts of positive and delayed bit feedback, but also the relative amplitude of feedback as compared to the amplitude of the input signal. Thus, the delay can be described in the terms of having very short rise and fall times compared to the time between adjacent pulses or data bits of information.

Also, while a differential amplifier has been shown for the production of out-of-phase signals in FIG. 2 and the inverter 26 has been shown in FIG. 1, the ultimate objective is to subtractively combine the positive and delayed feedback signals. Thus, while the embodiment shown uses a passive summation network for device 24, the inversion of the signal prior to the delay could be replaced by a subtractive device 24. This realization is also to be included within the concept of the present invention.

While I have shown a specific pair of implementations of the concept in the referenced copending application, I wish to be limited not by the specific embodiment shown, but only by the scope of the inventive concept as defined in the attached claims.

I claim:

1. The method of equalizing a digital data bit in a digital signal stream comprising the steps of:
   level detecting a summed first signal to be equalized and outputting a positive feedback second signal having a given phase and a further square pulse third signal having a phase opposite that of said second signal wherein each is indicative in polarity of the value of said first signal relative a reference decision threshold voltage;
   adjusting the gain of said second and third signals as a function of a settable control signal;
   time delaying said third signal by an amount equivalent to the time between adjacent data bits to produce a delayed fourth signal;
   summing said second and fourth signals produce a composite feedback signal; and
   summing said composie feedback signal with a digital pulse signal to be equalized to produce said summed first signal, said summed first signal providing equalized output information.

2. Apparatus for equalizing a digital data bit in a digital signal stream comprising, in combination
   level detecting first means for detecting summed first signal and outputting a positive feedback and further square pulse opposite phase second and third signals respectively each indicative in polarity of the value of said first signal relative a reference decision threshold volatage;
   adjusting sixth means, connected to said first means, for adjusting the gain of said second and third signals as a function of a settable control signal;
   time delaying second means, connected to said first means, for delaying said third signal by an amount equivalent to the time between adjacent data bits to produce a delayed fourth signal;
   summing third means, connected to said first and second means, for summing said second and said delayed fourth signals to produce a composite feedback signal;
   signal input fourth means for supplying a fifth signal to be equalized; and
   summing fifth means, connected to said first, third and fourth means, for summing said composite feedback signal with a digital pulse signal to be equalized to produce said summed first signal, said summed first signal providing equalized output information.

3. Equalization apparatus of the class described comprising in combination:
   first summing means, including first and second input means and output means;
   level detecting means, including input means, reference level means and first and second output means, connected to said output means of said first summing means for generating opposite phase output signals having a polarity in accordance with the level of a signal received from said summing means as compared with a signal received at said reference level means;
   second summing means, including first and second input means and output means, connected to said first output means of said level detecting means for receiving positive feedback, non-delayed signals therefrom;
   unfiltered delay means connected between said second output means of said level detecting means and the other input of said second summing means;
   means connecting said output means of said second summing means to said first input means of said first summing means;
   means for supplying input signals to be equalized to said second input means of said first summing means; and
   apparatus output means, connected to said first summing means, for supplying equalized output signals from said output means of said first summing means.

4. Apparatus as claimed in claim 3 comprising in addition:
   gain adjusting means connected to said level detecting means for optimizing intersymbol interference compensation.

5. The method of equalizing a digital pulse bit stream signal comprising the steps of:
   decision detecting logic level of bits in a bit stream first signal to generate a logic level second signal;
   filterlessly time delaying said second signal by a time equivalent to the time between the commencement of adjacent data bits to produce a third signal whose rise and fall times are very short as compared to the time of the time delay;

combining said second and third signals to produce a feedback fourth signal; and logically combining said fourth signal with a signal to be equalized to produce said first signal wherein the logically combined fourth signal includes positive feedback components of said second signal relative said first signal.

6. Apparatus for equalizing a digital pulse bit stream signal comprising in combination first means for decision detecting logic level of bits in a bit stream first signal to generate a logic level second signal;

time delaying and phase inverting second means, connected to said first means, for phase inverting and delaying said second signal by a time equivalent to the time between the commencement of adjacent data bits to produce a third signal whose rise and fall times are very short as compared to the time of the time delay;

third means, connected to said first and said second means, for combining said second and third signals to produce a feedback fourth signal; and fourth means, connected to said third and first means, for logically combining said fourth signal with a signal to be equalized to produce said first signal whereby the logically combined fourth signal includes positive feedback components representative of said second signal relative said first signal.

7. Apparatus as claimed in claim 6 wherein said first means includes means for adjusting the gain of said second signal to optimize the intersymbol interference compensation.

* * * * *